United States Patent
Vidyadhara et al.

(10) Patent No.: US 11,922,176 B2
(45) Date of Patent: Mar. 5, 2024

(54) CONTAINERIZED FIRMWARE SERVICES

(71) Applicant: Dell Products L.P., Round Rock, TX (US)

(72) Inventors: Sumanth Vidyadhara, Bangalore (IN); Yasaswi Saisriram Bhimaraju, Ongole (IN); Ankit Singh, Bangalore (IN); Neeraj Kumar Pant, Almora (IN)

(73) Assignee: Dell Products L.P., Round Rock, TX (US)

( * ) Notice: Subject to any disclaimer, the term of this patent is extended or adjusted under 35 U.S.C. 154(b) by 291 days.

(21) Appl. No.: 17/379,290

(22) Filed: Jul. 19, 2021

(65) Prior Publication Data
US 2023/0012979 A1 Jan. 19, 2023

(51) Int. Cl.
*G06F 15/177* (2006.01)
*G06F 9/00* (2006.01)
(Continued)

(52) U.S. Cl.
CPC ........ *G06F 9/4416* (2013.01); *G06F 9/45558* (2013.01); *G06F 11/1438* (2013.01);
(Continued)

(58) Field of Classification Search
CPC ............... G06F 9/4416; G06F 9/45558; G06F 11/1438; G06F 2009/45562;
(Continued)

(56) References Cited

U.S. PATENT DOCUMENTS 6,631,469 B1 * 10/2003 Silvester ............... G06F 1/3287
713/320
10,146,606 B2 12/2018 Onniyil et al.
(Continued)

FOREIGN PATENT DOCUMENTS

| CN | 103777968 A | * | 5/2014 |
| CN | 109992311 A | * | 7/2019 |
| JP | 2016071512 A | * | 5/2016 |

OTHER PUBLICATIONS

Ma J, Translation of CN-109992311-A, 2019 (Year: 2019).*
(Continued)

*Primary Examiner* — Xuxing Chen
(74) *Attorney, Agent, or Firm* — Larson Newman, LLP

(57) ABSTRACT

Temporary firmware is provided as cloud services. Different temporary firmware containers are downloaded via a communications network. A light-weight operating system launches and executes the temporary firmware containers during a boot operation, POST operation, or other scheme. The temporary firmware containers thus detect and perhaps resolve POST errors. The light-weight operating system may also download a full-service/resource operating system. A second or subsequent boot operation may be performed, but control is ceded to the full-service/resource operating system. Multiple firmware tenants may thus be temporarily downloaded to a bare metal machine to support POST error detection activities. Advanced OS serviceability, diagnostics, and other containerized firmware may thus be quickly and simply launched without requiring the excessive time and difficulties of using the full-service/resource operating system.

20 Claims, 6 Drawing Sheets

(51) Int. Cl.
*G06F 9/4401* (2018.01)
*G06F 9/455* (2018.01)
*G06F 11/14* (2006.01)

(52) U.S. Cl.
CPC .............. *G06F 2009/45562* (2013.01); *G06F 2009/4557* (2013.01); *G06F 2009/45575* (2013.01); *G06F 2009/45587* (2013.01); *G06F 2009/45595* (2013.01)

(58) Field of Classification Search
CPC ... G06F 2009/4557; G06F 2009/45575; G06F 2009/45587; G06F 2009/45595; G06F 9/4401; G06F 11/2284
See application file for complete search history.

(56) References Cited

U.S. PATENT DOCUMENTS

| | | |
|---|---|---|
| 2013/0013904 A1* | 1/2013 | Tran .......................... G06F 9/24 455/557 |
| 2016/0328564 A1 | 11/2016 | Vidyadhara et al. |
| 2022/0171648 A1* | 6/2022 | Rodriguez ............ G06F 9/5072 |

OTHER PUBLICATIONS

Chotoku N, Translation of JP-2016071512-A, 2016 (Year: 2016).*
Zeng W, Translation of CN-103777968-A, 2014 (Year: 2014).*
Using BIOSConnect to recover SupportAssist OS Recovery Partition; Article No. 000177771; Dell Technologies; Knowledge Base Article; Mar. 30, 2021.
Fonseca, Restore Your System Using Dell SupportAssist OS Recovery—About Your Online Magazine; About You—Dell SupportAssist; Oct. 23, 2020.
Containers at Google—A better way to develop and deploy applications; https://research.google.com/pubs/pub44843.html; 2016.

* cited by examiner

CONTAINERIZED FIRMWARE SERVICES

FIELD OF THE DISCLOSURE

This disclosure generally relates to information handling systems, and more particularly relates to temporary containerized firmware cloud services.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

Temporary firmware is provided as cloud services. The temporary firmware is downloaded as software containers via a communications network. A light-weight operating system launches and executes the temporary firmware during a boot operation, POST operation, or other scheme. The temporary firmware thus detects and perhaps resolves POST errors. The light-weight operating system may also instruct a computer machine to download a full-service/resource operating system. A second or subsequent boot operation may be performed, but control is ceded to the full-service/resource operating system. Multiple firmware tenants may thus be temporarily downloaded to the computer machine (such as an OEM bare metal build) to support POST error detection activities, security events, diagnostic activities, and any bare metal platform management activities. Advanced OS serviceability, diagnostics, and other containerized firmware may thus be quickly and simply launched without requiring the excessive time and download difficulties of using the full-service/resource operating system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings.

Figure 1:
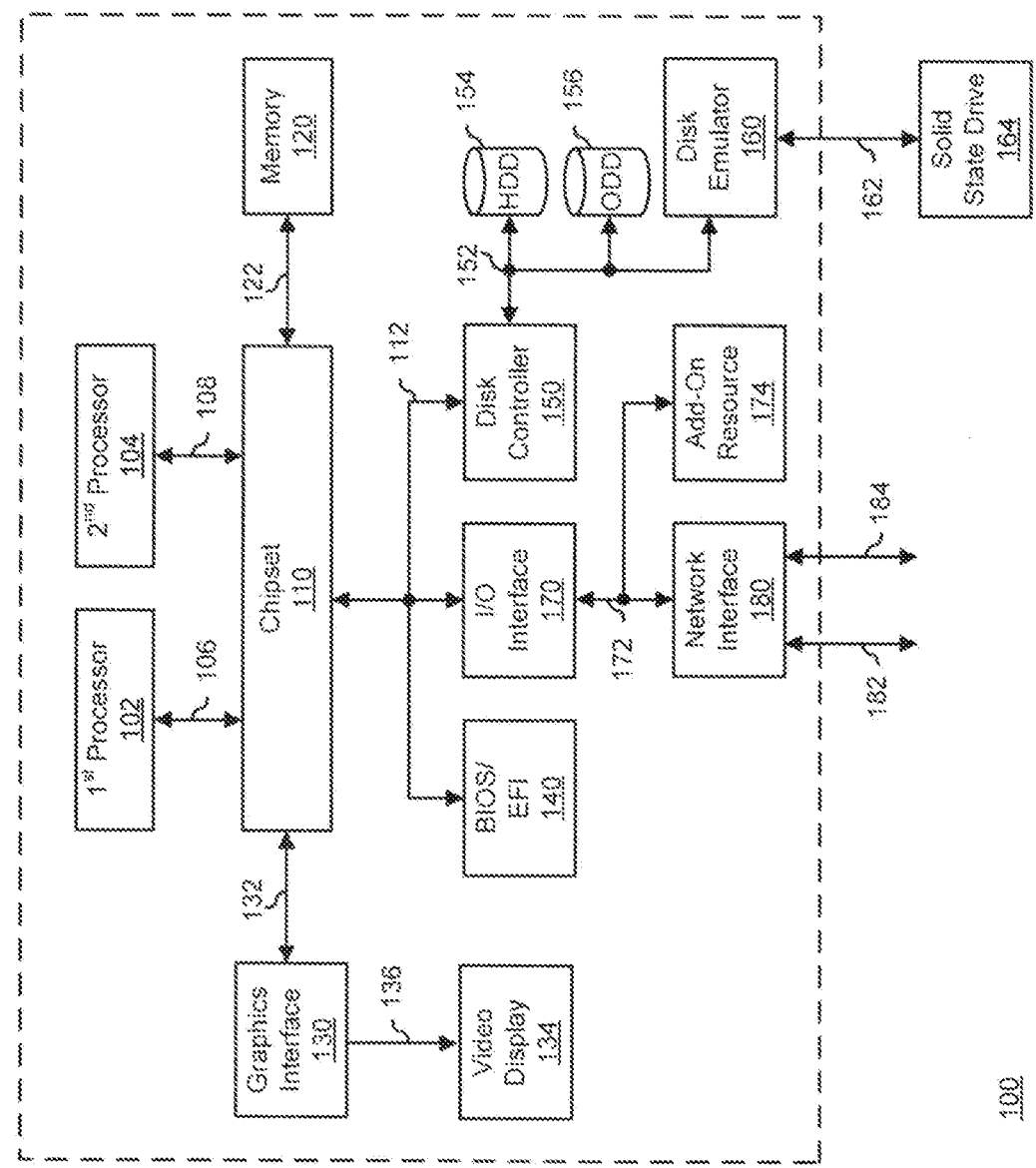
FIG. 1 is a block diagram of a generalized information handling system.

FIG. 1 illustrates an embodiment of an information handling system 100 including processors 102 and 104, chipset 110, memory 120, graphics adapter 130 connected to video display 134, non-volatile RAM (NV-RAM) 140 that includes a basic input and output system/extensible firmware interface (BIOS/EFI) module 142, disk controller 150, hard disk drive (HDD) 154, optical disk drive (ODD) 156, disk emulator 160 connected to solid state drive (SSD) 164, an input/output (I/O) interface 170 connected to an add-on resource 174, and a network interface device 180. Processor 102 is connected to chipset 110 via processor interface 106, and processor 104 is connected to chipset 110 via processor interface 108.

Chipset 110 represents an integrated circuit or group of integrated circuits that manages data flow between processors 102 and 104 and the other elements of information handling system 100. In a particular embodiment, chipset 110 represents a pair of integrated circuits, such as a north bridge component and a south bridge component. In another embodiment, some or all of the functions and features of chipset 110 are integrated with one or more of processors 102 and 104. Memory 120 is connected to chipset 110 via a memory interface 122. An example of memory interface 122 includes a Double Data Rate (DDR) memory channel, and memory 120 represents one or more DDR Dual In-Line Memory Modules (DIMMs). In a particular embodiment, memory interface 122 represents two or more DDR channels. In another embodiment, one or more of processors 102 and 104 include memory interface 122 that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like.

Graphics adapter 130 is connected to chipset 110 via a graphics interface 132, and provides a video display output 136 to a video display 134. An example of a graphics interface 132 includes a peripheral component interconnectexpress interface (PCIe) and graphics adapter 130 can include a four lane (×4) PCIe adapter, an eight lane (×8) PCIe adapter, a 16-lane (×16) PCIe adapter, or another configuration, as needed or desired. In a particular embodiment, graphics adapter 130 is provided on a system printed circuit board (PCB). Video display output 136 can include a digital video interface (DVI), a high definition multimedia interface (HDMI), DisplayPort interface, or the like. Video display 134 can include a monitor, a smart television, an embedded display such as a laptop computer display, or the like.

NV-RAM 140, disk controller 150, and I/O interface 170 are connected to chipset 110 via I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller 150 to HDD 154, to ODD 156, and to disk emulator 160. Disk interface 152 may include an integrated drive electronics (IDE) interface, an advanced technology attachment (ATA) such as a parallel ATA (PATA) interface or a serial ATA (SATA) interface, a SCSI interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, SSD 164 can be disposed within information handling system 100.

I/O interface 170 includes a peripheral interface 172 that connects I/O interface 170 to add-on resource 174, to TPM 176, and to network interface device 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a sound card, data storage system, an additional graphics interface, another add-on resource, or a combination thereof. Add-on resource 174 can be on a main circuit board, a separate circuit board or an add-in card disposed within information handling system 100, a device that is external to the information handling system, or a combination thereof.

Network interface device 180 represents a network communication device disposed within information handling system 100, on a main circuit board of the information handling system, integrated onto another element such as chipset 110, in another suitable location, or a combination thereof. Network interface device 180 includes a network channel 182 that provides an interface to devices that are external to information handling system 100. In a particular embodiment, network channel is of a different type than peripheral channel 172 and network interface device 180 translates information from a format suitable to the peripheral channel to a format suitable to external devices. In a particular embodiment, network interface device 180 includes a host bus adapter (HBA), a host channel adapter, a network interface card (NIC), or other hardware circuit that can connect the information handling system to a network. An example of network channel 182 includes an InfiniBand channel, a fiber channel, a gigabit Ethernet channel, a proprietary channel architecture, or a combination thereof. Network channel 182 can be connected to an external network resource (not illustrated). The network resource can include another information handling system, a data storage system, another network, a grid management system, another suitable resource, or a combination thereof.

The information handling system 100 may include a baseboard management controller (BMC). The BMC is connected to multiple elements of information handling system 100 via one or more management interface to provide out of band monitoring, maintenance, and control of the elements of the information handling system. As such, BMC represents a processing device different from processors 102 and 104, which provides various management functions for information handling system 100. In an embodiment, BMC may be responsible for granting access to a remote management system that may establish control of the elements to implement power management, cooling management, storage management, and the like. The BMC may also grant access to an external device. In this case, the BMC may include transceiver circuitry to establish wireless communications with the external device such as a mobile device. The transceiver circuitry may operate on a Wi-Fi channel, a near-field communication (NFC) channel, a Bluetooth or Bluetooth-Low-Energy (BLE) channel, a cellular based interface such as a global system for mobile (GSM) interface, a code-division multiple access (CDMA) interface, a universal mobile telecommunications system (UMTS) interface, a long-term evolution (LTE) interface, another cellular based interface, or a combination thereof. A mobile device may include Ultrabook, a tablet computer, a netbook, a notebook computer, a laptop computer, mobile telephone, a cellular telephone, a smartphone, a personal digital assistant, a multimedia playback device, a digital music player, a digital video player, a navigational device, a digital camera, and the like.

The term BMC may be used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller, and embedded controllers included at the blades of the blade server can be referred to as blade management controllers. Out-of-band communication interfaces between BMC and elements of the information handling system may be provided by management interface that may include an inter-integrated circuit (I2C) bus, a system management bus (SMBUS), a power management bus (PMBUS), a low pin count (LPC) interface, a serial bus such as a universal serial bus (USB) or a serial peripheral interface (SPI), a network interface such as an Ethernet interface, a high-speed serial data link such as PCIe interface, a network controller-sideband interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

In an embodiment, the BMC implements an integrated remote access controller (iDRAC) that operates to monitor and maintain system firmware, such as code stored in BIOS/EFI module 142, option ROMs for graphics interface 130, disk controller 150, add-on resource 174, network interface 180, or other elements of information handling system 100, as needed or desired. In particular, BMC includes a network interface that can be connected to a remote management system to receive firmware updates, as needed or desired. Here BMC receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC utilizes various protocols and application programming interfaces (APIs) to direct and control the processes for monitoring and maintaining the system firmware. An example of a protocol or API for monitoring and maintaining the system firmware includes a graphical user interface (GUI) associated with BMC, an interface defined by the Distributed Management Taskforce (DMTF) (such as Web Services Management (WS-MAN) interface, a Management Component Transport Protocol (MCTP) or, Redfish interface), various vendor defined interfaces (such as Dell EMC Remote Access Controller Administrator (RACADM) utility, Dell EMC Open Manage Server Administrator (OMSS) utility, Dell EMC Open Manage Storage Services (OMSS) utility, Dell EMC Open Manage Deployment Toolkit (DTK) suite), representational state transfer (REST) web API, a BIOS setup utility such as invoked by a "F2" boot option, or another protocol or API, as needed or desired.

In a particular embodiment, BMC is included on a main circuit board (such as a baseboard, a motherboard, or any combination thereof) of information handling system 100, or is integrated into another element of the information handling system such as chipset 110, or another suitable element, as needed or desired. As such, BMC can be part of an integrated circuit or a chip set within information handling system 100. BMC may operate on a separate power plane from other resources in information handling system 100. Thus BMC can communicate with the remote management system via network interface or the BMC can communicate with the external mobile device using its own transceiver circuitry while the resources or elements of information handling system 100 are powered off or at least in low power mode. Here, information can be sent from the remote management system or external mobile device to BMC and the information can be stored in a RAM or NV-RAM associated with the BMC. Information stored in the RAM may be lost after power-down of the power plane for BMC, while information stored in the NV-RAM may be saved through a power-down/power-up cycle of the power plane for the BMC.

In a typical usage case, information handling system 100 represents an enterprise class processing system, such as may be found in a datacenter or other compute-intense processing environment. Here, there may be hundreds or thousands of other enterprise class processing systems in the datacenter. In such an environment, the information handling system may represent one of a wide variety of different types of equipment that perform the main processing tasks of the datacenter, such as modular blade servers, switching and routing equipment (network routers, top-of-rack switches, and the like), data storage equipment (storage servers, network attached storage, storage area networks, and the like), or other computing equipment that the datacenter uses to perform the processing tasks.

Errors may be difficult to diagnose and to debug. Pre-boot errors (such as hardware errors occurring during a power-on self-test operation) are conventionally detected by the BIOS 142. In order to diagnose and to debug these pre-boot hardware errors, a more complex software stack (such as an operating system or OS) is required. A large and memory-intensive operating system, in other words, must be executed to diagnose and to debug problem issues such as network connectivity, GPU errors, MKTME-based errors, VPN, RADIUS Authentication (MS-CHAP), and other hardware-based errors. The conventional BIOS 142 lacks capabilities to resolve pre-boot errors.

Remote diagnosis is also challenging. Remote OS install and OS recovery on a bare metal computer machine may be accomplished using cloud-based service support (such as Dell's BIOSConnect platform that allows BIOS to connect to an HTTP backend and load an image). A bare metal computer machine refers to a computer executing instructions stored or written to logic hardware without the intervening operating system. However, the inventors have realized that a bare metal computer machine launching BIOSConnect over a VPN network is difficult to repeatedly accomplish. The BIOS 142 must include a network software stack for network connectivity, which is complex and time consuming to develop.

Conventional BIOS lacks other capabilities. For example, the existing BIOS schemes lack the capability to perform an OS install over a VPN Network to a bare metal computer machine. The inventors find launching software artifacts behind a VPN tunnel, using a bare metal computer machine and conventional BIOS, is too complex and unreliable.

Figure 2:
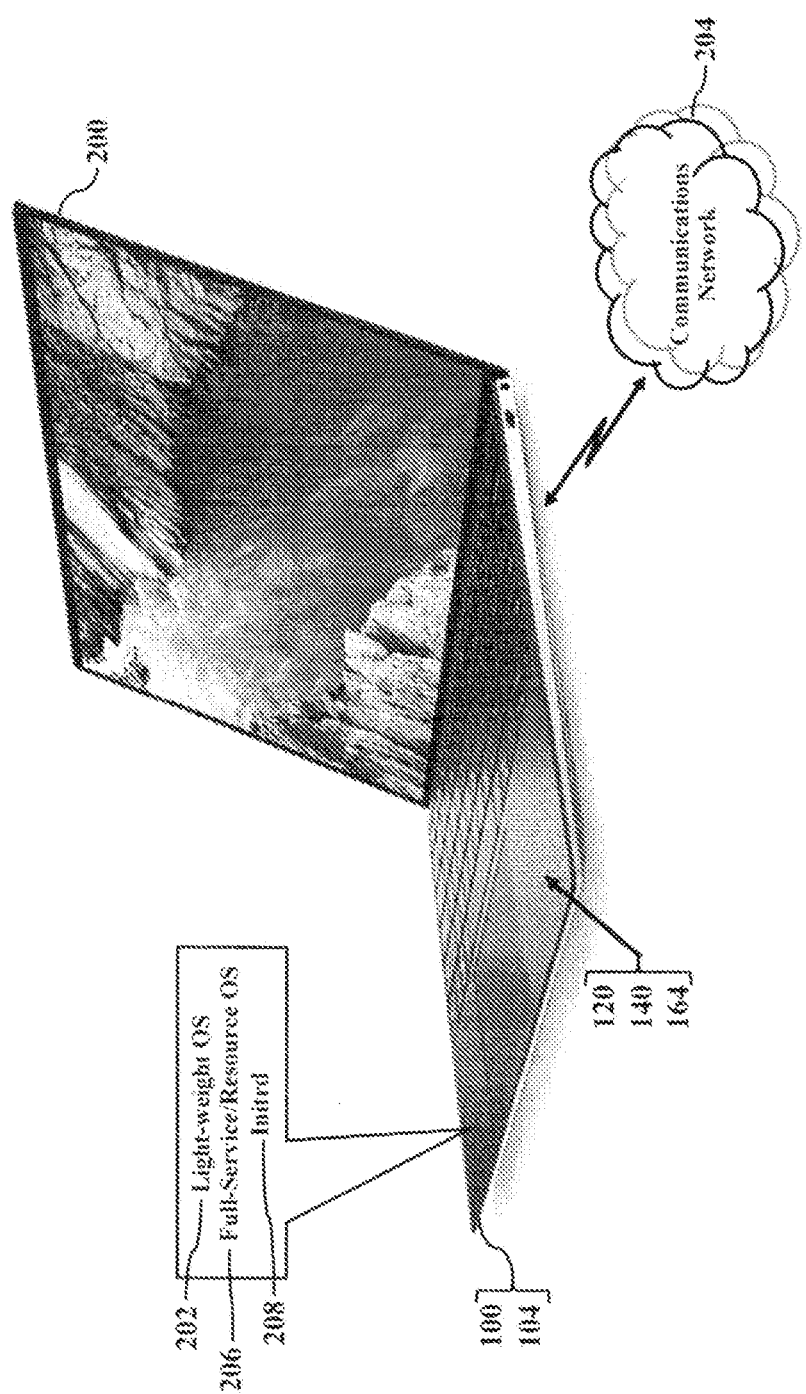
FIG. 2 further illustrates the information handling system, according to exemplary embodiments

FIG. 2 further illustrates the information handling system 100, according to exemplary embodiments. The information handling system 100 is illustrated as a laptop computer 200, which most readers are thought familiar. The information handling system 100, however, may also be embodied as a smartphone, a desktop computer, a tablet computer, or any other processor-controlled device. A light-weight software operating system (OS) 202 is stored by the memory device 120 (such as the non-volatile RAM 140, the solid-state drive 164, and/or other non-volatile ROM, flash, or magnetic/optical hard drive). The light-weight operating system 202 may be embedded during an initial manufacture of the memory device 120 and/or of the laptop computer 200 by an Original Equipment Manufacturer. The light-weight operating system 202, however, may also be downloaded and/or updated via the network interface device (illustrated as reference numeral 180 in FIG. 1) to a communications network 204 (such as the public Internet and/or a virtual private network). The light-weight operating system 202, however, has low or perhaps substantially reduced system requirements, capabilities, and services. The light-weight operating system 202 is thus a separate software component from a conventional or "heavy," full-service/resource operating system 206 (perhaps also stored in the memory device 120). The light-weight operating system 202, for example, has substantially less programming lines/statements than the full-service/resource operating system 206. The light-weight operating system 202 may thus only consume perhaps 15 MB within the non-volatile RAM 140, whereas MICROSOFT® WINDOWS® 10 Enterprise (a well-known full-service/resource operating system 206) may consume gigabytes (e.g., 1-2 GB of RAM and 16-20 GB hard disk space).

The light-weight operating system 202 may include a LINUX® kernel having added support of WIFI, EFI FRAMEBUFFER, NETWORK STACK, MOUSE, UDEV, IPC, VGA CONSOLE, and Serial console. The light-weight operating system 202 may also include support for a PL2303 USB-Serial device, a virtual console, and any other features or capabilities desired in actual practice. The light-weight operating system 202 may also interface with the initrd software application 208, which is the well-known LINUX® scheme for loading a temporary root file system into the memory device 120 (such as the non-volatile RAM 140).

Figure 3:
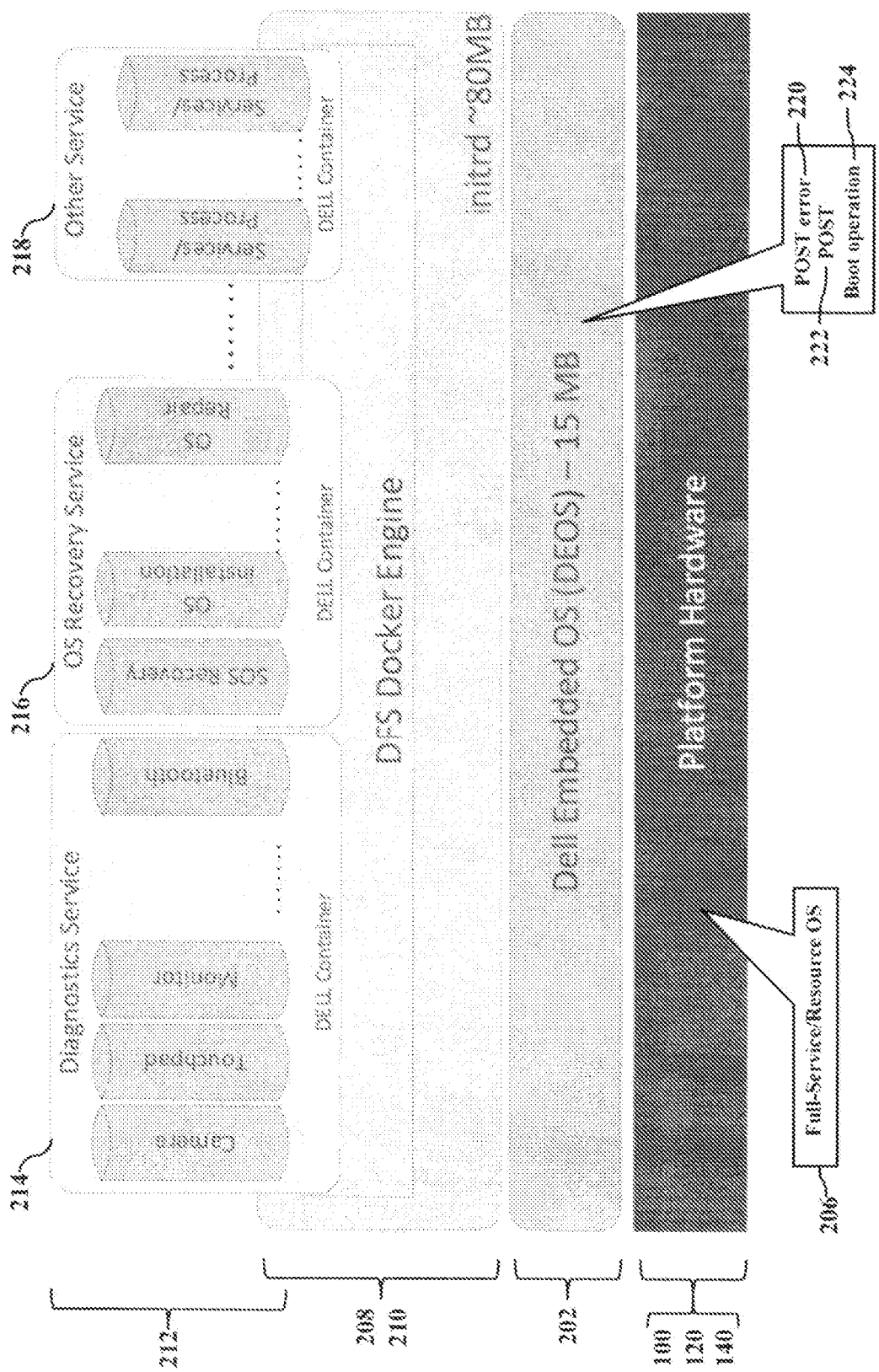
FIG. 3 illustrates a stacked software architecture, according to exemplary embodiments.

FIG. 3 illustrates a stacked software architecture, according to exemplary embodiments. The light-weight operating system 202 and/or the initrd software application 208 configure(s) the memory device 120 (such as the non-volatile RAM 140) for container-based services. The platform hardware installed within the information handling system 100 (such as the processors 102 and 104, the chipset 110, and/or the baseboard management controller explained with reference to FIG. 1) may execute the light-weight operating system 202 and/or the initrd software application 208 to host a Docker engine 210. The light-weight operating system 202 and/or the initrd software application 208 thus executes software containers or package(s) or libraries and implements the temporary firmware 212 as one or more cloud services. The light-weight operating system 202 and/or the initrd software application 208, for example, may establish and execute an NVRAM diagnostics services container 214 (perhaps stored in the memory device 120, NVRAM 140, and/or drive 164 illustrated in FIGS. 1-2). The NVRAM diagnostics services container 214 contains an entire runtime environment for diagnosing and for resolving/debugging pre-boot hardware errors (such as a POST error 220), perhaps detected during a power-on self-test (POST) operation 222 executed during a boot operation 224. The NVRAM diagnostics services container 214, however, may process and support any operational event, including security events, diagnostic activities, and any bare metal platform management activities. Because the NVRAM diagnostics services container 214 packages its entire runtime environment, the NVRAM diagnostics services container 214 logically bundles any needed application(s), dependencies, libraries, binaries, and configuration files into a single software package. The NVRAM diagnostics services container 214 is thus decoupled, isolated, and independent from other software applications, services, and workloads. The information handling system 100 need only execute the much smaller light-weight operating system 202 (consuming only about 15 MB), the initrd software application 208 (consuming only about 80 MB), and/or the docker engine 210 (consuming less than 100 MB). The NVRAM diagnostics services container 214 is thus the entire temporary firmware 212 platform for diagnosing and debugging a camera, touch screen/pad, display monitor, wireless networking interfaces, and any other hardware resources.

Other package containers may also be established. An NVRAM OS recovery service container 216 may be additionally or alternatively configured as another temporary firmware 212 (perhaps stored in the memory device 120, NVRAM 140, and/or drive 164 illustrated in FIGS. 1-2). The NVRAM OS recovery service container 216 establishes an entire runtime environment for installing, repairing, and recovering the full-service/resource operating system 206.

FIG. 3 also illustrates a generic service container 218 that represents any other temporary firmware 212 implemented as a cloud service (perhaps stored in the memory device 120, NVRAM 140, and/or drive 164 illustrated in FIGS. 1-2). Any temporary firmware 212 may thus be offered, downloaded, and executed prior to downloading the far larger full-service/resource operating system 206 (which may require many minutes or even hours, depending on network bandwidth and other considerations).

The temporary firmware 212 is thus very advantageous to OEM "bare metal" computer machines. The Docker engine 210 executes the software containers (214, 216, and 218) representing the temporary firmware 212 (perhaps a runnable instance of an image). Whatever the software container packages, the containers are portable, light weighted and secure. The software container packages may thus be advantageous for continuous integration and continuous delivery (CI/CD) workflows like Enterprise installation, SOS recovery, diagnostics, etc. Once the required service is completed, the software container packages may be configured for removal/deletion (such as from the non-volatile RAM 140). Any changes of state (associated with any software container package) may thus not be stored in persistent storage and may disappear (for example, any temporarily stored or downloaded file will be deleted after service).

Figure 4:
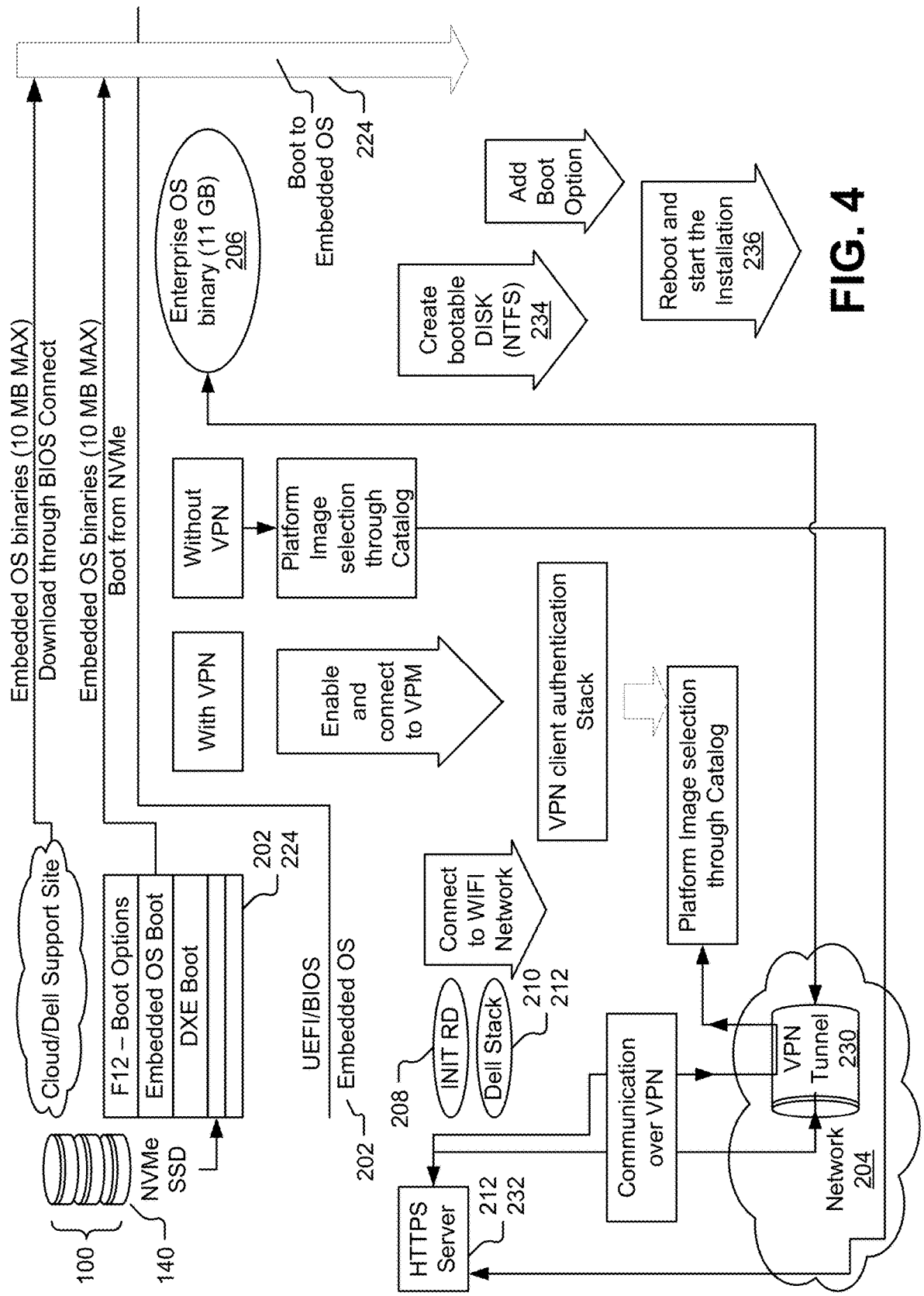
FIG. 4 illustrates a containerized workflow, according to exemplary embodiments.

FIG. 4 illustrates a containerized workflow, according to exemplary embodiments. The temporary firmware 212 (such as the NVRAM diagnostics services container 214, the NVRAM OS recovery service container 216, or the generic service container 218 illustrated in FIG. 3) may be installed/updated via a VPN secure connection 230. The light-weight operating system 202 may be stored onto non-volatile memory (such as the non-volatile RAM 140) and added as a F12 Boot option (e.g., the boot operation 224). The light-weight operating system 202 may optionally be downloaded via the communications network 204 using the VPN secure connection 230 (or any other public/private connection to the Internet/cloud/network) through any pre-boot application (such as the NVRAM diagnostics services container 214, the NVRAM OS recovery service container 216, or Dell's BIOSConnect software application). The light-weight operating system 202 may be download onto a bare metal platform (such as the information handling system 100) during OEM manufacture. The light-weight operating system 202 may then execute the boot operation 224 and thereafter initiate a download and install of the initrd software application 208. The light-weight operating system 202 initiates the secure VPN connection 230 to a network resource (such as an HTTPS server 232) storing the temporary firmware 212. If the light-weight operating system 202 successfully authenticates to the HTTPS server 232, the light-weight operating system 202 instructs or causes the information handling system 100 to download an Enterprise OS image representing the full-service/resource operating system 206. Once the Enterprise OS image is downloaded, the Enterprise OS image is extracted onto a storage location (such as hard disk using NTFS partition 234) to render a bootable drive. The light-weight operating system 202 may then set a flag, pointer, or other configuration option that causes future/subsequent boot operations (illustrated as reference numeral 236) to use the Enterprise OS image extracted to the bootable drive. The light-weight operating system 202 may then instruct or cause the information handling system 100 to re-execute the boot operation 236 using the Enterprise OS image extracted to the bootable drive, thus surrendering or ceding boot control to the full-service/resource operating system 206. The information handling system 100 thus re-boots and the full-service/resource operating system 206 will be installed through the same NTFS partition 234.

Figure 5:
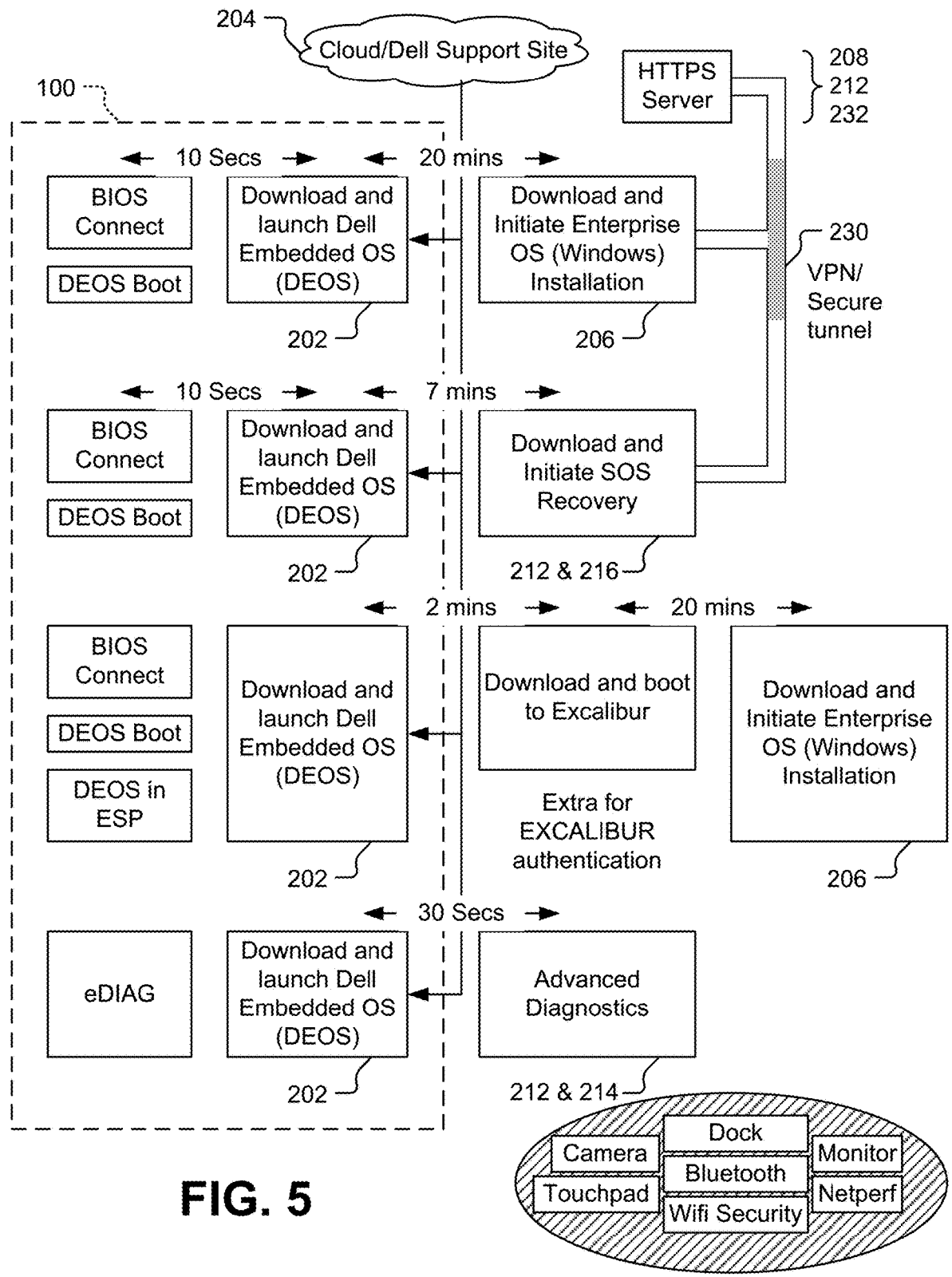
FIG. 5 illustrates firmware as cloud service, according to exemplary embodiments.

FIG. 5 illustrates the temporary firmware 212 as cloud services, according to exemplary embodiments. The information handling system 100 may first obtain the light-weight operating system 202. While the light-weight operating system 202 may be preloaded, FIG. 5 illustrates remote retrieval as a service from a cloud resource (such as the HTTPS server 232). Once network communication is established between the information handling system 100 and the HTTPS server 232, the information handling system 100 may retrieve/download the light-weight operating system 202 and/or the initrd software application 208. Because the light-weight operating system 202 only requires about 15 MB of packetized data, only seconds in time are needed to retrieve and to store the light-weight operating system 202 (perhaps to the NVRAM 140, as previously explained). The information handling system 100 may then execute the light-weight operating system 202 and/or the initrd software application 208.

The containerized, temporary firmware 212 may be retrieved. As the light-weight operating system 202 and/or the initrd software application 208 are executed, either or both applications 202/208 may command or instruct the information handling system 100 to establish the secure VPN tunnel connection 230 to the HTTPS server 232. The HTTPS server 232 functions as a central repository for containerized, temporary firmware services. Once network communication is established between the information handling system 100 and the HTTPS server 232, the information handling system 100 may begin retrieving/downloading the containerized, temporary firmware 212. The information handling system 100 may also download packets of data representing the full-service/resource operating system 206 (such as the MICROSOFT® WINDOWS® 10 Enterprise OS). Because the full-service/resource operating system 206 requires many gigabytes (such as 1-2 GB of RAM and 16-20 GB hard disk space), FIG. 5 illustrates that about twenty (20) minutes may be needed to retrieve and to store the full-service/resource operating system 206. The information handling system 100 may continue and similarly retrieve and download the containerized, temporary firmware 212 (such as the NVRAM diagnostics services container 214 and the NVRAM OS recovery service container 216 illustrated in FIGS. 3-4). Because these containerized, temporary firmware 212 consume much less memory space in bytes, the containerized, temporary firmware 212 may only require several seconds or minutes to download, initiate, and install.

Exemplary embodiments thus provide the containerized, temporary firmware 212 as cloud services. Different firmware containers may be downloaded (perhaps during the boot operation 224 and/or the POST operation 222). The different containerized, temporary firmware 212 consume and/or share the byte space partitioned or configured in a non-volatile memory (such as the NVRAM 140) for temporary firmware services executed perhaps during the boot operation 224 and/or the POST operation 222. The light-weight operating system 202 and/or the initrd software application 208 launch and execute the various containerized, temporary firmware 212 (such as detecting and perhaps resolving POST errors). Once the light-weight operating system 202 and/or the initrd software application 208 completes the processing tasks specified by the containerized, temporary firmware 212, the light-weight operating system 202 and/or the initrd software application 208 may command the information handling system 100 to perform a second or subsequent boot operation (illustrated as reference numeral 236 in FIG. 4). During this second or subsequent boot operation 236, the information handling system 100 switches execution from the light-weight operating system 202 to the full-service/resource operating system 206, thus ceding OS control to the full-service/resource operating system 206. The full-service/resource operating system 206 (or some other utility program) may delete the light-weight operating system 202, the initrd software application 208, and/or the containerized, temporary firmware 212 from the non-volatile memory device 140.

The different containerized, temporary firmware 212 may thus have a tenant-sharing arrangement. The containerized, temporary firmware 212 may each specialize in a particular boot or POST task for simple and efficient operation and consumption of byte space. Multiple firmware tenants may thus be downloaded to temporarily populate the non-volatile memory device 120. These multiple firmware tenants support POST error detection activities, perhaps by using the open-source Docker container format. Exemplary embodiments may thus authenticate Dockerized firmware containers with platform service using the light-weight operating system 202 to launch advanced OS serviceability and diagnostics.

Figure 6:
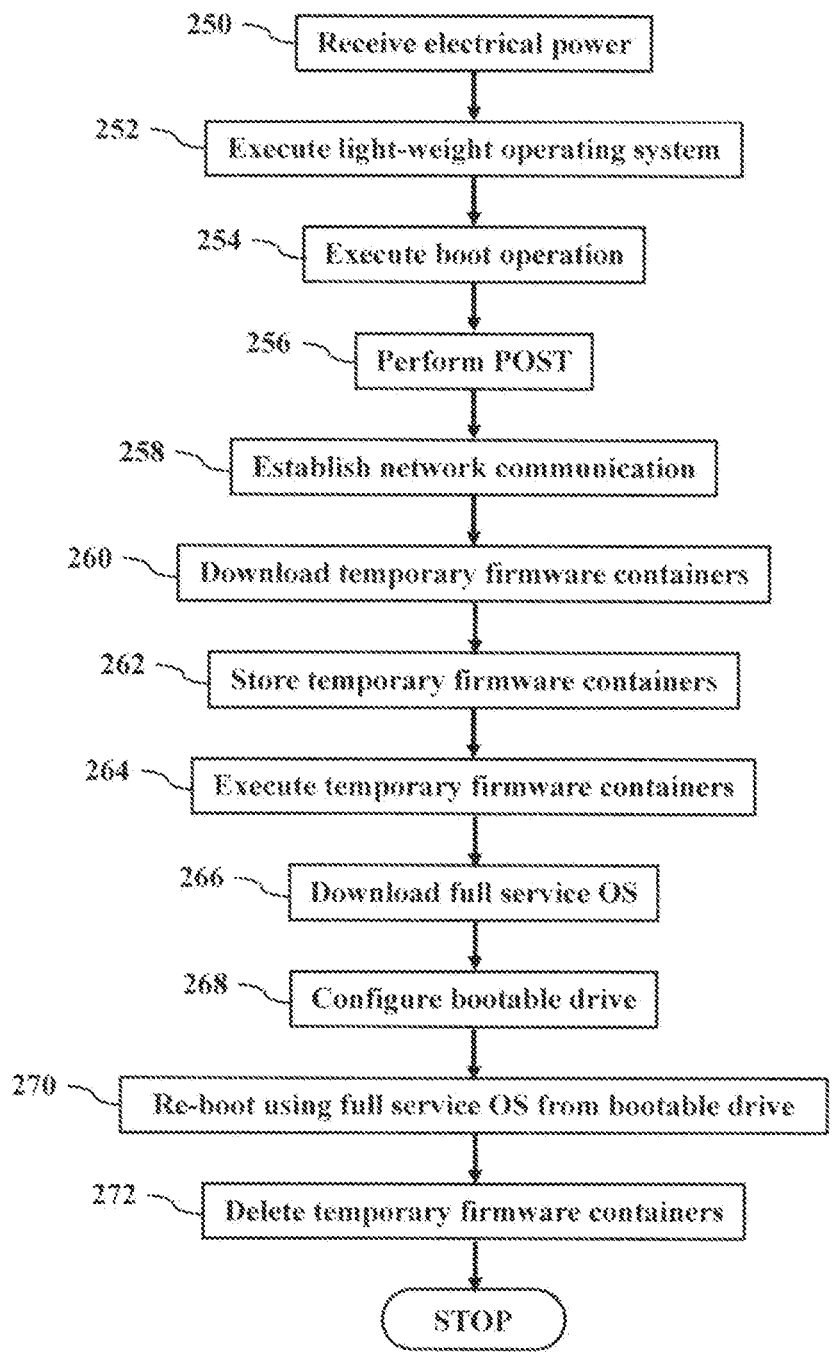
FIG. 6 is a flowchart or algorithm, executed by the information handling system, illustrating temporary firmware cloud services, according to exemplary embodiments.

FIG. 6 is a flowchart or algorithm, executed by the information handling system 100, that provides temporary firmware cloud services, according to exemplary embodiments. The information handling system 100 receives electrical power (e.g., current and voltage perhaps produced by a AC/DC power supply) (Block 250). The information handling system 100 executes the light-weight operating system 202 (Block 252), executes the boot operation 224 (Block 254), and performs the POST operation 224 (Block 256). The light-weight operating system 202 instructs the information handling system 100 to establish network communication with a network resource (such as the HTTPS server 232) (Block 258) and to download the temporary firmware 212 (Block 260). The light-weight operating system 202 instructs the information handling system 100 to store the temporary firmware 212 to the memory device 120 (such as the NVRAM 140) (Block 262) and to execute the temporary firmware 212 (Block 264). The light-weight operating system 202 may also instruct the information handling system 100 to download the full-service/resource operating system 206 (Block 266) and to configure a bootable drive storing the full-service/resource operating system 206 (Block 268). The light-weight operating system 202 may then instruct the information handling system 100 to reboot using the full-service/resource operating system 206 (Block 270). The light-weight operating system 202 and/or the full-service/resource operating system 206 may also instruct the information handling system 100 to delete the temporary firmware 212 from the memory device 120 (such as the NVRAM 140) (Block 272).

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method executed by an information handling system that downloads a temporary firmware container as a cloud service, the method comprising:
   downloading, by the information handling system, a light-weight operating system by establishing a network communication with a network resource;
   storing the light-weight operating system in a non-volatile memory device;
   performing a boot operation by executing the light-weight operating system;
   during the boot operation, downloading a full-service operating system by establishing a secure tunnel communication with the network resource;
   during the boot operation, downloading the temporary firmware container via the secure tunnel communication established with the network resource; and
   during the boot operation, executing the temporary firmware container as the cloud service.

2. The method of claim 1, further comprising storing the temporary firmware container in the non-volatile memory device.

3. The method of claim 1, further comprising deleting the temporary firmware container.

4. The method of claim 1, further comprising diagnosing the information handling system during the boot operation.

5. The method of claim 1, further comprising diagnosing the information handling system during the executing of the temporary firmware container.

6. The method of claim 1, wherein after the executing of the temporary firmware container, further comprising executing a reboot operation of the information handling system.

7. The method of claim 6, further comprising switching, during the reboot operation, control from the light-weight operating system to the full-service operating system.

8. A system that downloads a firmware container as a cloud service, the system comprising:
   a hardware processor; and
   a memory device accessible to the hardware processor, the memory device storing instructions that when executed by the hardware processor perform operations, the operations including:
   downloading an embedded software operating system by establishing a network communication with a cloud resource;
   storing the embedded software operating system in a non-volatile memory device;
   performing a boot operation by executing the embedded software operating system;
   during the boot operation, downloading a full-service operating system by establishing a secure tunnel communication with a central repository;
   during the boot operation, downloading the firmware container via the secure tunnel communication established with the central repository; and
   during the boot operation, executing the firmware container as the cloud service.

9. The system of claim 8, wherein the operations further include storing the firmware container in the non-volatile memory device.

10. The system of claim 8, wherein the operations further include deleting the firmware container.

11. The system of claim 8, wherein the operations further include diagnosing the information handling system during the boot operation.

12. The system of claim 8, wherein the operations further include diagnosing the information handling system during the executing of the firmware container.

13. The system of claim 8, wherein the operations further include after the executing of the firmware container executing a reboot operation of the information handling system.

14. The system of claim 13, wherein the operations further include switching, during the reboot operation, control from the embedded software operating system to the full-service operating system.

15. A non-transitory memory device storing instructions that when executed by a hardware processor perform operations, the operations including:
   downloading an embedded software operating system by establishing a network communication with a cloud resource;
   storing the embedded software operating system in a non-volatile memory device;
   performing a boot operation by executing the embedded software operating system;
   during the boot operation, downloading a full-service operating system by establishing a secure tunnel communication with a central repository;
   during the boot operation, downloading the firmware container via the secure tunnel communication established with the central repository; and
   during the boot operation, executing the firmware container as the cloud service.

16. The non-transitory memory device of claim 15, wherein the operations further include storing the firmware container in the non-volatile memory device.

17. The non-transitory memory device of claim 15, wherein the operations further include deleting the firmware container.

18. The non-transitory memory device of claim 15, wherein the operations further include diagnosing the information handling system during the boot operation.

19. The non-transitory memory device of claim 15, wherein the operations further include after the executing of the firmware container executing a reboot operation of the information handling system.

20. The non-transitory memory device of claim 19, wherein the operations further include switching, during the reboot operation, control from the embedded software operating system to the full-service operating system.

* * * * *